United States Patent
Zuck

(10) Patent No.: US 7,874,314 B2
(45) Date of Patent: Jan. 25, 2011

(54) MOTOR FUEL CONNECTOR WITH REPLACEABLE TIP SEAL

(75) Inventor: James C. Zuck, Marshall, MI (US)

(73) Assignee: Marshall Excelsior Company, Marshall, MI (US)

( * ) Notice: Subject to any disclaimer, the term of this patent is extended or adjusted under 35 U.S.C. 154(b) by 392 days.

(21) Appl. No.: 12/103,535

(22) Filed: Apr. 15, 2008

(65) Prior Publication Data

US 2009/0256356 A1    Oct. 15, 2009

(51) Int. Cl.
*F16L 37/28* (2006.01)
*F16L 35/00* (2006.01)

(52) U.S. Cl. .......................... 137/614.04; 137/614.05; 251/360; 251/363

(58) Field of Classification Search ................ 137/614.03–614.05; 251/359, 360, 363, 149.1, 251/149.6
See application file for complete search history.

(56) References Cited

U.S. PATENT DOCUMENTS

| 6,655,498 B1 * | 12/2003 | Sasa et al. | 137/614.04 |
| 7,490,864 B2 * | 2/2009 | Cheng | 137/614.05 |

* cited by examiner

*Primary Examiner*—Kevin L Lee
(74) *Attorney, Agent, or Firm*—Waters & Associates; John A. Waters

(57) ABSTRACT

An improved fuel line connector for connecting a fuel line connection valve to a fuel cylinder outlet valve includes an improved, replaceable tip seal mounted on the tip or nose of the connector valve. The tip seal provides an additional, effective face seal between the connector body and the cylinder outlet valve. The tip seal, being on the fuel line connector, can be maintained and replaced by the party using the vehicle or filling the fuel cylinder.

6 Claims, 3 Drawing Sheets

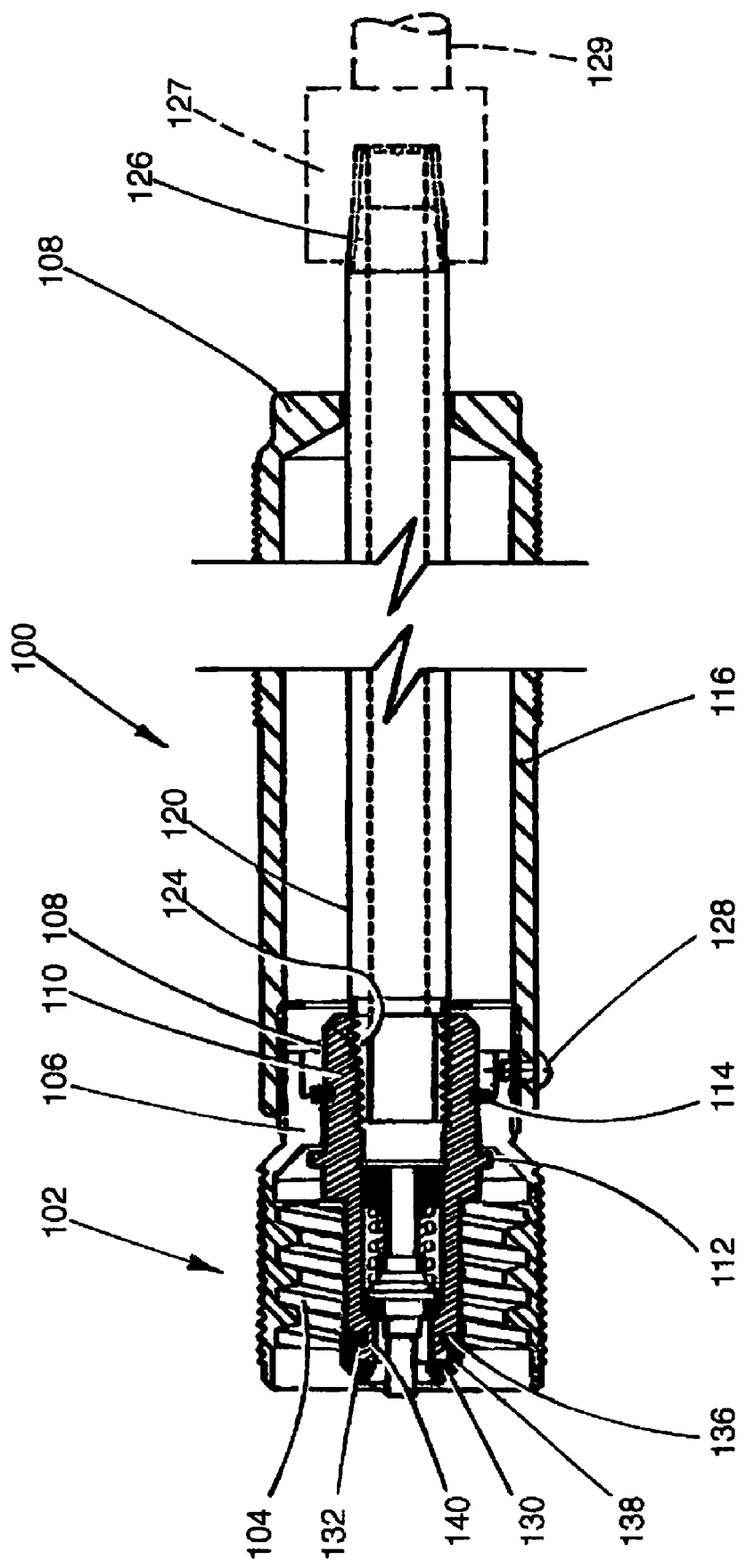

MOTOR FUEL CONNECTOR WITH REPLACEABLE TIP SEAL

BACKGROUND OF THE INVENTION

A number of vehicles, such as forklift trucks, operate on liquid phase LP gas fuel that is typically provided in refillable or replaceable fuel cylinders, which are frequently maintained by third parties.

In order to connect a motor fuel carburetion line with a fuel cylinder, a female connector mounted on the end of the carburetor fuel line engages a male connector on the fuel cylinder. The male connector usually is a threaded acme fitting on an outlet valve that is mounted on the service valve outlet of the fuel cylinder. The fuel line connector mates with the male acme connector of the outlet valve. The fuel line connector can include an outwardly biased, normally closed fuel line connector valve. The fuel cylinder outlet valve and fuel line connector valve mate when the connectors are threaded together. This enables both valves to open, permitting fuel flow from the pressurized fuel cylinder to the motor. The service valve on which the outlet valve is mounted includes a manually operable shutoff valve. A quick fit connector also can be used.

To fill such a fuel cylinder, fuel from a pressurized LP gas storage tank can be transferred by a fuel hose through the same service valve inlet of the fuel cylinder by means of a motor fuel filler valve that is connectable by a threaded connection to the acme fitting on the outlet valve connected to the service valve outlet. A quick fit connector also can be used.

In both cases, two annular seals are usually employed for the connection, an O ring seal and a flat gasket seal incorporated in the outlet valve on the fuel cylinder. These seals are prone to leakage, especially on connecting and disconnecting the connectors, and the seals wear out and break from time to time and require replacement. A problem with replacement is that the seals needing replacement are in the control of the fuel cylinder provider, and the vehicle operator can be provided with a leaky connection over which he has no control. This can result in substantial fuel loss at the vehicle operator's expense.

An object of the present invention is to provide a fuel line connector having an improved, replaceable tip seal that can be mounted on the fuel line in order to provide an additional, effective seal against leakage, and which can be maintained and replaced by the party using the vehicle or filling the fuel cylinder.

BRIEF SUMMARY OF THE INVENTION

The present invention comprises an improved fuel line connector for connecting a fuel line to a fuel cylinder outlet valve wherein the connector includes an improved, replaceable tip seal mounted on the tip or nose of the connector valve. The tip seal provides an additional, effective face seal between the connector body and the cylinder outlet valve. The tip seal, being on the fuel line connector, can be maintained and replaced by the party using the vehicle or filling the fuel cylinder.

BRIEF DESCRIPTION OF THE SEVERAL VIEWS OF THE DRAWING

FIG. 3 is a longitudinal sectional view of a motor fuel filler valve of the present invention.

DETAILED DESCRIPTION OF THE INVENTION

Figure 1:
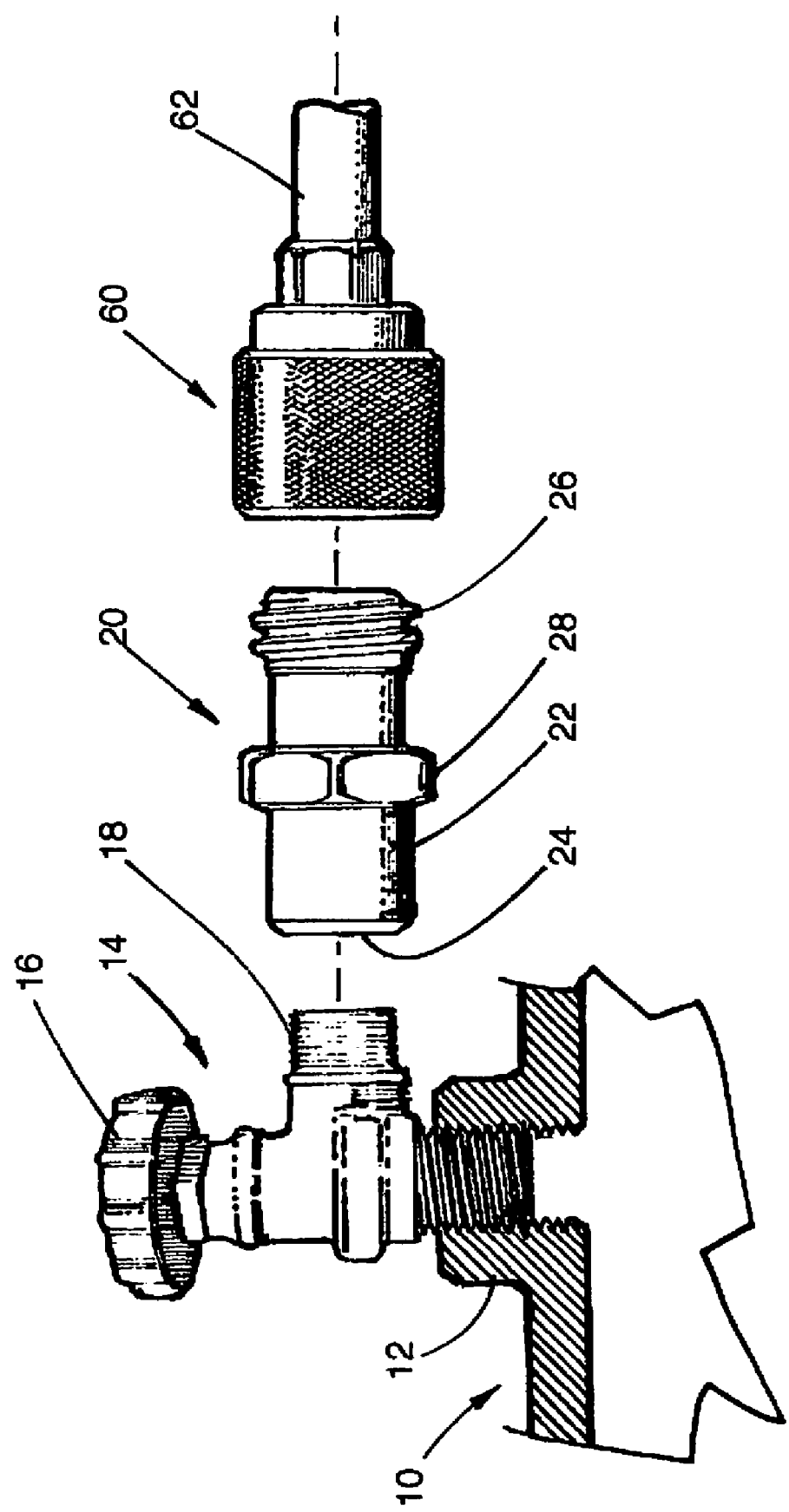
FIG. 1 is an exploded view showing a fuel line connector with replaceable tip seal of the present invention in position for attachment to an outlet valve of a fuel cylinder service valve.

In accordance with the present invention, a motor fuel LP gas cylinder 10 has an internally threaded outlet 12, with a service valve 14 mounted in the outlet. Service valve 14 includes a conventional shutoff valve operated by wheel handle 16. A service valve outlet 18 having conventional pipe threads is connected with an outlet valve 20. Outlet valve 20 includes an annular body 22 having an internally threaded inlet 24 that fits on the service valve outlet fitting and has an externally threaded outlet 26 at an opposite end of the body. The outlet is a conventional acme fitting, which typically is a one and one quarter inch fitting. A nut flange 28 having flattened portions is incorporated in the body for attaching the outlet valve to the service valve using a conventional wrench.

Figure 2:
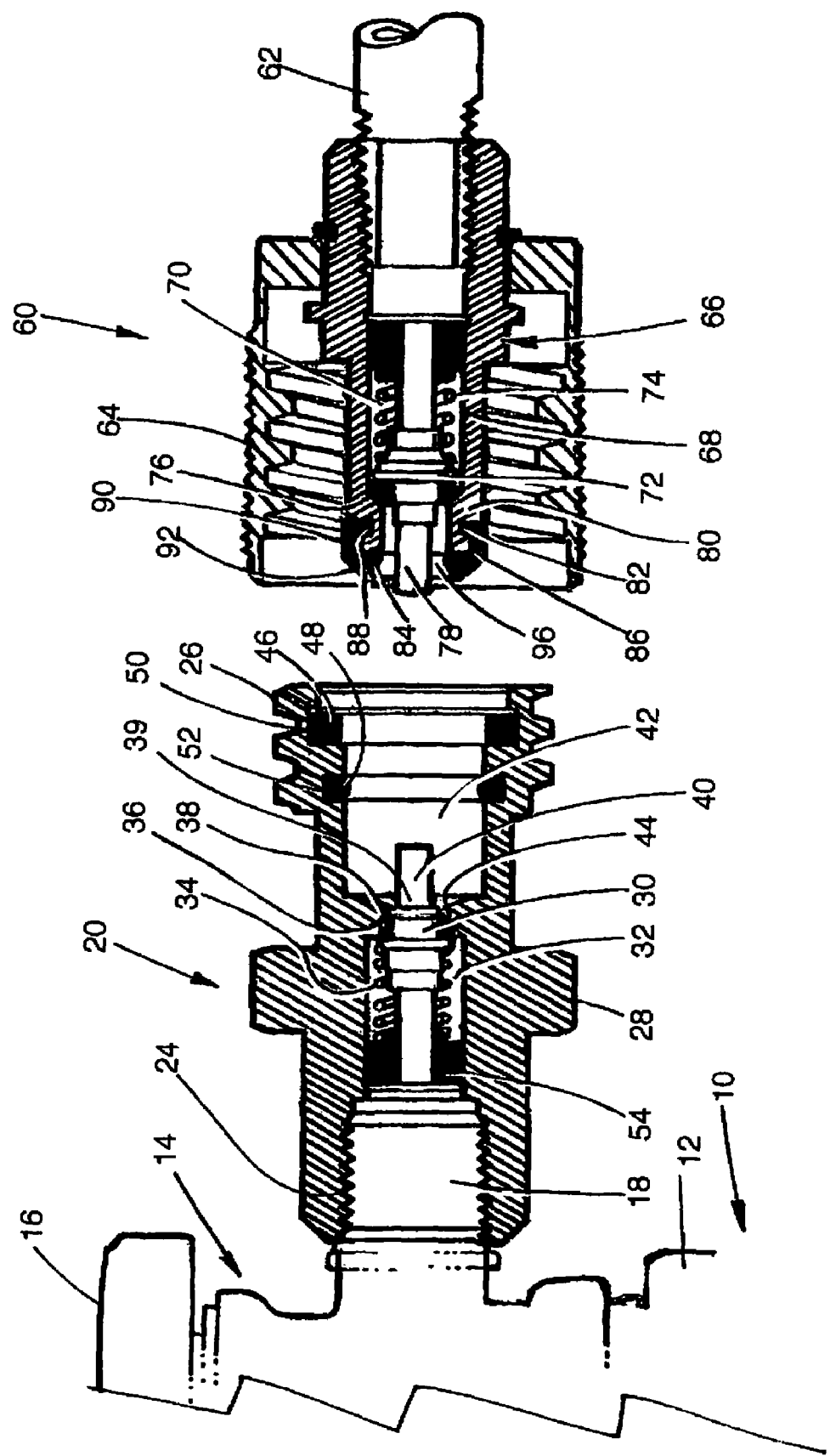
FIG. 2 is a longitudinal sectional view showing the fuel line connector of the present invention in position to be threaded onto the outlet valve of the service valve of FIG. 1.

As shown in FIG. 2, outlet valve 20 includes an outwardly biased, normally closed valve member 30 mounted in an open interior 32 of the valve body 22. The outlet valve keeps the service valve outlet closed until the service valve is properly connected to a carburetion line or fuel line. Compression spring 34 urges a seal 36 on an enlarged portion of valve member 30 into sealing contact with a valve seat 38 that surrounds an outlet orifice 39. A projection 40 on the end of valve member 30 extends through the orifice into a recessed opening 42 that extends inwardly from the outer end of the valve body. An inclined surface 44 is formed around orifice 39 at the base of recessed opening 42. Flat seal 46 and 0 ring seal 48 are mounted in grooves 50 and 52 respectively in the periphery of recessed opening 42. Valve member 30 is mounted in axial alignment in the open interior of the valve member by means of a guide 54 that permits fluid flow past the guide.

A fuel line connector 60 mounted on the end of a carburetion fuel line 62 or other fuel conduit is shown in position to be joined with outlet valve 20. Connector 60 includes an internally threaded annular female connector or nut 64 mounted rotatably on a connector valve 66. Connector valve 66 includes an annular body 68 having an open interior 70 extending through the body and having a valve member 72 movably mounted in the open interior. Valve member 72 is spring biased by a spring 74 outwardly to a closed position against a valve seat 76 positioned outwardly from the valve member. A projection 78 extending from valve member 72 extends through valve seat 76 to an outer side thereof. The annular valve body 68 also extends beyond valve seat 76 to form a collar or nose 80 on the outer side of the valve seat. Collar 80 has a peripheral external groove 82 adjacent the outer end or nose 84 thereof. A ring shaped resilient compressible seal 86 fits on the end of nose 58. An inwardly projecting peripheral flange 88 on an annular skirt 90 of the seal fits in groove 82 and resiliently holds the seal on the end of nose 80. The seal has a beveled outer surface 92 that mates with inclined surface 44 that serves as a valve seat at the base of recessed opening 42. Seal 86 has an interior opening 96 therethrough that permits LP gas to flow through the seal into the interior of fuel line 62 when seal 86 is nested against valve seat 44. Nose seal 86 thus provides an additional seal, over and above interior O ring and gasket seals 46 and 48, which are conventionally mounted in the interior opening of outlet valve 20. In the exemplary embodiment, the seal is formed of PTFE impregnated carboxylated nitrile material. Other materials can be used.

The nose seal provides a face seal between opposing valve elements and provides substantial additional protection against seal leakage. Moreover, the nose seal is in the control of the forklift truck operator and thus can be maintained and replaced when desired.

While the nose seal feature is described in connection with the carburetion line above, the same nose seal feature can be incorporated into a fuel hose delivery fitting and other types of fuel line connectors. A hose end fitting or filler valve assembly 100 for a forklift filler assembly is shown in FIG. 3. Filler valve assembly 100 comprises an internally threaded connector or nut 102 that includes internal acme threads 104. A flange 106 at the rear end of nut 102 is rotatably mounted on the body of connector valve 108, which is substantially the same as connector valve 66. Flange 106 is held in axial position on body 110 of connector valve 108 by a peripheral ridge 112 on one side and by a removable external retaining ring 114 on the other side. A tubular filler valve body 116 is mounted on an outer end to the inner flange 106 of valve nut 102. The filler valve body serves as a handle for holding the filler valve. Filler valve body 116 includes an inner end 118. A filler tube or stem 120 extends axially through the interior of filler valve body and has a threaded outer end 124 that engages the internally threaded opening in connector valve 108. An inner end 126 of stem 120 is threaded and extends beyond the end 118 of tubular filler valve body 116. End 126 is threaded into an internally threaded fitting 127 on the end of a fuel supply hose 129 that is in fluid communication with an LP gas fuel tank. Tubular handle or filler valve body is attached by a drive screw 128 to valve nut 102, so that the valve nut can be screwed onto the service valve acme fitting by rotating the filler valve body or the valve nut.

As shown in FIG. 3, connector valve 108 is substantially the same as connector valve 66 employed in connection with the carburetion hose. Connector valve 108 includes a replaceable tip seal 130 that mounts on the end of collar 132 of connector valve body 110, with an inwardly extending flange 136 on skirt 138 fitting into a groove 140 in the end of connector valve body 110. Tip seal 130 provides an additional and replaceable seal in connecting hose end filler valve 100 with the service valve acme fitting in the same way as the fuel line connector described above.

The hose end fitting and fuel conduit coupling member of the present invention both can be attached to the standard acme fitting in the fuel cylinder outlet valve for the purpose of transferring fuel from the fuel cylinder to an outer fuel carburetion line or for filling the fuel cylinder from an LP gas storage tank, and both can use the same nose seal.

It should be understood that the foregoing is merely representative of the preferred practice of the present invention and that various changes in the arrangements and details of construction of the embodiments disclosed herein may be made without departing from the spirit and the scope of the present invention.

What is claimed is:

1. In a fuel connection for connecting an LP gas fuel line to a service valve outlet valve on an LP gas cylinder by means of a releasable fuel line connector on the end of the fuel line, wherein the fuel line connector is releasably connectable to an outlet valve connector on the service valve outlet valve, the outlet valve including a normally closed valve that is biased outwardly from the cylinder toward an outer end of the outlet valve, the fuel line connector including a normally closed connector valve that is biased outwardly from the end of the fuel line, the service valve outlet valve and fuel line connector valve being biased toward each other, and the valves being opened by engagement together when the fuel line connector is mounted on the outlet valve connector, the service valve outlet valve having a recessed opening in an outer end of a valve body of the service valve outlet valve, the connector valve fitting in the recessed opening when the connectors are joined, the improvement wherein the connector valve includes a valve body that forms a collar surrounding an end of a valve member thereof, the collar fitting into the recessed opening in the service valve outlet valve body and abutting an end of the opening, an annular tip seal being releasably mounted on the end of the collar so as to engage the end of the recessed opening in the outlet valve body, the tip seal sealing the end of the collar against the outlet valve body when the valves are fastened together, the seal having an open interior that permits fuel flow therethrough while the annular seal seals the joint between the valve bodies.

2. The fuel connection according to claim 1 wherein the annular tip seal includes a beveled outer surface.

3. The fuel connection according to claim 1 wherein the annular tip seal is formed of a PTFE impregnated carboxylated nitrile material.

4. The fuel connection according to claim 1 wherein the annular tip seal includes an inwardly projecting peripheral flange.

5. The fuel connection according to claim 4 wherein the peripheral flange projects from an annular skirt of the annular tip seal.

6. The fuel connection according to claim 4 wherein the peripheral flange fits in a peripheral external groove in the collar.

\* \* \* \* \*